United States Patent [19]
Miller et al.

[11] Patent Number: 6,054,091
[45] Date of Patent: *Apr. 25, 2000

[54] J HOOK-TYPE HOOK STRIP FOR A MECHANICAL FASTENER

[75] Inventors: Philip Miller, Eagan; William L. Melbye, Woodbury, both of Minn.

[73] Assignee: Minnesota Mining and Manufacturing Co., St. Paul, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/723,632

[22] Filed: Oct. 3, 1996

[51] Int. Cl.⁷ .............................. B29C 47/00; A44B 18/00
[52] U.S. Cl. .......................... 264/442; 24/452; 264/167; 264/280; 264/296; 264/492
[58] Field of Search ..................... 264/167, 280, 264/285, 296, 442, 492; 24/452, 442, 446, 450; 425/363, 367

[56] References Cited

U.S. PATENT DOCUMENTS

| | | | |
|---|---|---|---|
| 2,717,437 | 9/1955 | De Mestral | 28/72 |
| 3,009,235 | 11/1961 | De Mestral | 28/78 |
| 3,027,595 | 4/1962 | Takai et al. | 18/10 |
| 3,147,528 | 9/1964 | Erb | 24/204 |
| 3,192,589 | 7/1965 | Pearson | 24/204 |
| 3,235,438 | 2/1966 | Wisotzky | 161/62 |
| 3,270,408 | 9/1966 | Nealis . | |
| 3,312,583 | 4/1967 | Rochlis | 161/62 |
| 3,408,705 | 11/1968 | Kayser et al. | 24/204 |
| 3,555,601 | 1/1971 | Price | 18/10 |
| 3,557,407 | 1/1971 | Lemelson . | |
| 3,590,109 | 6/1971 | Doleman et al. . | |
| 3,594,863 | 7/1971 | Erb | 18/5 |
| 3,594,865 | 7/1971 | Erb | 18/5 |
| 3,718,725 | 2/1973 | Hamano | 264/163 |
| 3,726,000 | 4/1973 | Menzin et al. | 24/204 |
| 4,290,174 | 9/1981 | Kalleberg | 24/204 |
| 4,454,183 | 6/1984 | Wollman | 428/92 |
| 4,628,709 | 12/1986 | Aeschbach et al. | 66/9 |
| 4,984,339 | 1/1991 | Provost et al. | 24/452 |
| 5,058,247 | 10/1991 | Thomas et al. | 24/448 |
| 5,077,870 | 1/1992 | Melbye et al. | 24/452 |
| 5,260,015 | 11/1993 | Kennedy et al. | 264/167 |
| 5,315,740 | 5/1994 | Provost | 24/452 |
| 5,318,741 | 6/1994 | Thomas | 264/519 |
| 5,339,499 | 8/1994 | Kennedy et al. | 24/452 |
| 5,368,549 | 11/1994 | McVicker | 24/452 |
| 5,385,706 | 1/1995 | Thomas | 264/519 |
| 5,505,747 | 4/1996 | Chesley et al. | 51/297 |
| 5,604,963 | 2/1997 | Akeno | 24/452 |
| 5,625,930 | 5/1997 | Takizawa et al. | 24/452 |

FOREIGN PATENT DOCUMENTS

| | | |
|---|---|---|
| 0 324 577 | 7/1989 | European Pat. Off. . |
| 0 325 528 | 7/1989 | European Pat. Off. . |
| 0771537 | 5/1997 | European Pat. Off. . |
| 1383501 | 2/1964 | France . |
| 3244410 A1 | 10/1983 | Germany . |
| 1102627 | 2/1968 | United Kingdom . |
| 2009257 | 6/1979 | United Kingdom . |
| WO 82/02480 | 8/1982 | WIPO . |
| WO 87/06522 | 11/1987 | WIPO . |
| WO 94/23610 | 10/1994 | WIPO . |

OTHER PUBLICATIONS

Injection Molding Handbook, Dominick V. Rosato and Donald V. Rosato, Van Nostrand Reinhold Company, p. 504.

Primary Examiner—Jan H. Silbaugh
Assistant Examiner—Mark Eashoo
Attorney, Agent, or Firm—Robert W. Sprague; Gary Griswold; William J. Bond

[57] ABSTRACT

A method of making a hook strip having J-shaped hooks that can be used as a mechanical fastener. The method includes using an initial substrate of material formed as an array of upstanding precursor stems having distal tips at their ends opposite a backing. In addition, a heat source adapted for heating and a mechanism for deforming stem tips is provided. The substrate is positioned relative to the heat source such that a portion of the upstanding stems on the array is heated. Subsequently, the substrate is moved to a position relative to the mechanism for deforming to create a hook strip of J-shaped hooks from the heated portion of the upstanding stems. In addition, an article of manufacture, made in accordance with the method, is provided which includes a hook portion of a hook-and-loop type of mechanical fastener.

18 Claims, 4 Drawing Sheets

PRIOR ART

J HOOK-TYPE HOOK STRIP FOR A MECHANICAL FASTENER

FIELD OF THE INVENTION

The invention relates generally to mechanical fasteners such as hook-and-loop fasteners. More particularly, the invention relates to J hook-type hook strips such as can releasably close a garment, e.g., a disposable garment such as a diaper or a hospital gown when attached to a suitable loop material.

BACKGROUND

Hook-and-loop fasteners are widely used as garment fasteners. Commercial examples of these fasteners include those marketed under the VELCRO brand by Velcro USA Incorporated and under the SCOTCHMATE brand by Minnesota Mining and Manufacturing Company, St. Paul, Minn., which fasteners are made by a variety of methods. Early versions of the hook materials still available today are taught in U.S. Pat. Nos. 2,717,437 and 3,009,235 (both by DeMestral), where a hook strip is made from specific warps of upstanding nylon loop pile. One leg of each loop is cut to leave an open-ended J-shaped hook, which is available to act as a fastening element.

U.S. Pat. No. 3,594,865 (Erb) describes an injection molding technique for manufacturing a J-shaped hook strip of a hook-and-loop fastener. The technique taught is the use of a closed "loop material" having a large number of separate shallow "wire dies" formed in the loop material. While applying a vacuum to evacuate the "wire dies", the closed loop is passed through an extruder which forces molten plastic, such as nylon, into the dies while also impregnating a fabric web immediately beneath the loop material. Upon exiting from the extruder, excess resin is stripped from the surface of the wire dies. The resilient hooks then come progressively out of the dies, providing an orderly array of hooks projecting from a plastic impregnated fabric web. Instead of using a fabric web, the apparatus can be modified to create a space beyond the wire dies into which the molten plastic can flow to form an all-plastic backing for the hooks. Another U.S. Pat. No. 3,594,863 (Erb) relates to similar apparatus for producing a similar hook-bearing strip. These patents state that the disclosed method can produce a wider variety of shapes than a traditional solid die which is limited to shapes that taper from base to tip. However, this method would likewise be limited to shapes that must taper inward except in this case, from one outer face to an opposing face along the length of the hook. It is also difficult to impregnate the polymer in the supporting fabric behind the "loop material".

In U.S. Pat. No. 3,718,725 (Hamano), the hook strip fastener of a hook-and-loop mechanical fastener is made from a fabric having an orderly array of upstanding loops. After inserting rods into rows of loops to maintain their upstanding position, platens or rollers apply heat and pressure to melt each loop at its summit and to press each free molten end to form a knob or head that can inter-engage with the loop strip of a hook-and-loop fastener. Because the knobs or heads have a mushroom appearance, this type of hook fastener is called "mushroom-type".

Mushroom-type hook fasteners are sometimes designed so that two like hook strips can be fastened together. Such self-mating types of mushroom-type mechanical fasteners are shown in U.S. Pat. No. 3,192,589 (Pearson) which calls the fastener "hermaphroditic" because its headed studs have both male and female characteristics when intermeshed. The Pearson fasteners can be made by molding a base from which integral headless studs project and then heat softening the tips of the studs.

The hermaphroditic mushroom-type mechanical fastener shown in U.S. Pat. No. 4,290,174 (Kalleberg) is made with flexible, resilient, U-shaped monofilaments. The "central bight portion" of each monofilament is embedded in a flexible bonding layer so that two stems of the monofilament project normally from the surface of the bonding layer. There is a mushroom head at the tip of each stem formed by heating the terminal ends of the monofilaments, preferably formed of a polyolefin. The stems preferably are substantially uniformly spaced and of substantially equal length. Maximum disengagement force is achieved when the spacing between adjacent heads is less than their diameters and the minimum required for engagement.

U.S. Pat. No. 3,408,705 (Kayser et al.) also shows mushroom-type mechanical fasteners having mushroom heads of several shapes. The "globe-shaped" (e.g., mushroom-shaped) heads are formed by heating cylindrical stems. J-hook shaped heads are formed by heating stems with wedge-shaped terminal ends.

Another procedure for continuously molding a J-shaped hook strip is described in U.S. Pat. No. 3,762,000 (Menzin et al). The process uses mold plates with cavities for molding upstanding J hook members or pile-like formations. The moldable plastic material is applied in two steps, first under high pressure to form the J hook-shaped pile-like formations while still in the cavities and secondly under lower pressure to form the strip constituting a base member so that the J hook-type protuberances are integrally attached. U.S. Pat. No. 5,260,015 (Kennedy et al.) alters the Menzin et al. molding process by adding processing steps to firmly bond a backing material to the molded J hook-type extruded hook fastener strips.

U.S. Pat. No. 4,984,339 (Provost et al.) discloses a molded J-shaped hook which has a profile defined by an inner smoothly contoured, generally concave face and an outer, generally convex face. The hook tapers smoothly and continuously downward in width from a sturdy base member to a free end. The hook is designed so that it will not deform to release a loop engaging the hook in shear at or below a desired applied force.

U.S. Pat. No. 5,315,740 (Provost) discloses a molded hook shaped like that in U.S. Pat. No. 4,984,339 which is designed for use with a low profile loop closure system. A displacement volume is determined for the hook which is defined, generally, as a rectangular parallelepiped surrounding the hook tip.

There still exists a need for an improved method for making J hook-type hook strips without using time consuming and complicated molding processes to create J hook-shaped stems on a backing material.

SUMMARY OF INVENTION

The invention overcomes the above-identified limitations in the field by providing a simple method of making a hook strip having J-shaped hooks that can be used as a mechanical fastener. In a preferred embodiment, the method includes using a pre-existing substrate of material formed as an array of upstanding stems of thermoplastic material on a backing, the stems having tips at the ends opposite the end attached to the backing. The stem generally taper from base to tip and is preferably symmetrical along its length, e.g., circular or polygonal. In addition, a heat source adapted for heating and a mechanism for deforming the stem tips is provided. The substrate is positioned relative to the heat source such that a portion of the tips of the upstanding stem array is heated. Subsequently or simultaneously, the substrate is moved to a position relative to the mechanism for deforming the heated tip portions of the upstanding stem array to create a hook strip of J-shaped hooks. In addition, an article of manufacture made in accordance with the method, is provided which includes a J-shaped hook portion of a hook-and-loop type of mechanical fastener as described below.

BRIEF DESCRIPTION OF DRAWING

The figures, except for FIGS. 9 through 12, are idealized and are not necessarily to scale.

DETAILED DESCRIPTION OF ILLUSTRATIVE EMBODIMENTS

Figure 1:
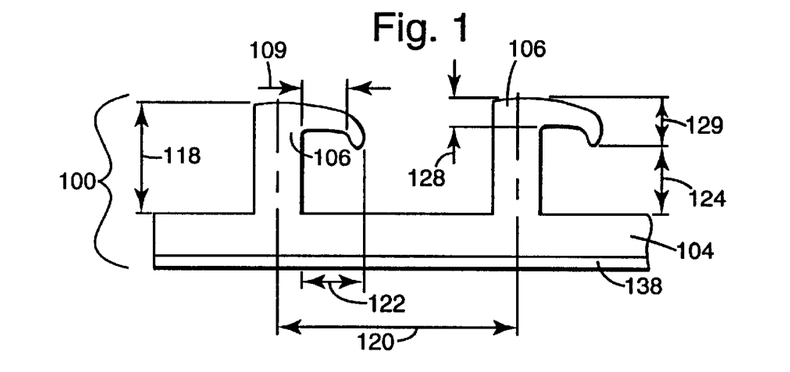
FIG. 1 is a schematic side view of a J-shaped hook strip in accordance with the present invention.

FIG. 1 is a side view of a schematic representation of the present invention hook strip 100 for a hook-and-loop mechanical fastener which is particularly well suited for use in garments and disposable articles. The hook strips are especially useful in refastenable fastening systems for disposable absorbent articles such as infant diapers, training pants, adult incontinent articles, and feminine hygiene products. The hook strips could also be used in fastening systems on hospital gowns and surgical drapes.

Figure 2:
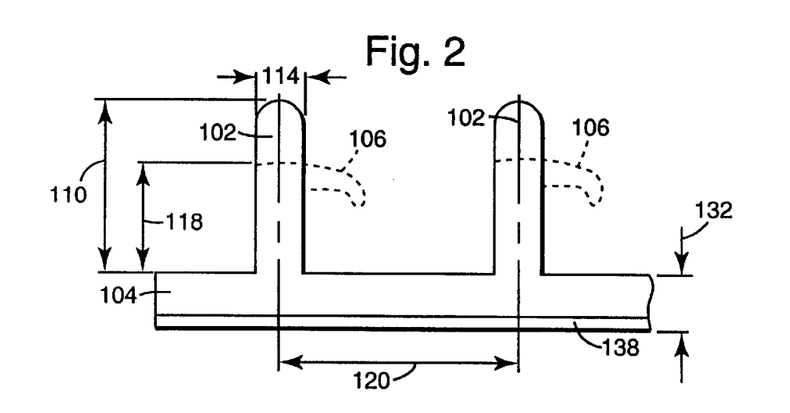
FIG. 2 is a schematic side view of upstanding stems used to form the J-shaped hooks of the invention.

The invention hook strip is formed in a two step method. The form of the hook strip after each step is generally shown in FIG. 2. The first step is to extrude tall upstanding precursor stems 102, integral with a film backing 104. The second step is the directional deformation of the stems 102 into J-shaped hooks 106.

In one process for performing the first step, stems 102 are made by extruding resin into cavities formed in a mold to form a substrate having an array of upstanding stems and an integral backing. To facilitate removal of the stems for the mold cavities, the stems are preferably tapered from base to tip. To form a stable base for the hooks and provide for uniform hook head formation the base is also preferably of a shape which is generally symmetrically about its center such as polygonal or preferably circular. The stems as such have at least one axis of symmetry and preferably 2 or 3 or more axis of symmetry. A substantially circular shape is preferred in terms of stem stability, resistance to compressibility, stem and hook head manufacturability including uniform hook head formation. In one preferred embodiment, the stems are between about 0.1 millimeters (mm) to 5 mm in height.

Figure 3:
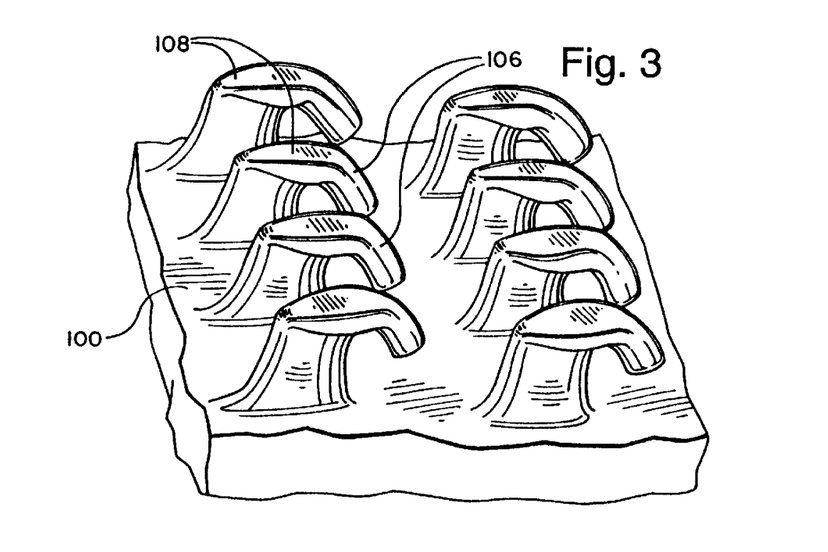
FIG. 3 is a perspective view of a portion of a J-shaped hook strip in accordance with the present invention.

Subsequently, in a preferred process for performing the second step a calender is used to form the stems 102 into J-shaped hooks. The calender gap is set to a height smaller than the combined height of the stems on the substrate taken with the backing thickness. The calender roller which deforms a portion of the stems is preferably heated to a temperature which will soften the thermoplastic material forming the stems. The heated calender roller is adjusted to run at a different speed than the web or substrate so that it wipes the stem passing through the calender gap. The wiping action on the stems with the heated roller simultaneously melts and deforms the tips which, if properly set, can form the deformed tips into J-shaped hooks as shown in FIG. 3, which depicts a portion of a hook strip actually formed using the above calender method. These J-shaped hooks include a substantially planar upper surface 108.

This substantially planar surface 108 can be slightly non-planar across its length and width rising slightly to form a central depression or caldera-like structure. Alternatively, the sides or peripheral region surrounding the substantially flat planar surface 108 can fall off forming a slightly rounded hill or mesa-shaped structure. In any event, the top portions 108 of the hook heads are generally smooth and planar. This has been unexpectedly found to not significantly effect the ability of these hooks to penetrate nonwoven, knitted or stitchbonded relatively open loop materials while the planar surface 108 advantageously provides a non-irritating, tactily smooth surface. This planar upper hook surface 108 makes the hook strip particularly well suited for use in disposable or temporary use garment applications where the mechanical fasteners are used close to or next to the wearer's skin.

Several parameters characterize the embodiment of J-shaped hooks 106, as shown in FIGS. 1–3 which can be produced by the above calender or other disclosed processes herein. These include a precursor stem height 110, stem diameter 114, final hook height 118, and distance between hooks 120. Also, defining the hooks are a hook opening width 122, hook opening height 124, hook head thickness 128 at the base of the head 107, hook head height 129, hook overhang 109 as well as the overall surface area of the planar top portions 108 of the hooks. The film caliper or backing thickness 132 further defines the J hook-type hook strip.

Hook strip 100 can be formed from virtually any thermoplastic material which can be extruded, as needed. Possible thermoplastic materials include polyolefins, such as polypropylenes, polyethylenes and copolymers and blends thereof, polyesters, polystyrenes, polyamides and the like.

Several alternative processes are possible to form J-shaped hooks 106 in the second step of the invention method. As noted above, one process involves passing a film backing having upstanding precursor stems 102 through a calender gap where a heated roller is moving at a different speed than the substrate (i.e., either faster or slower than the substrate or even rotating in the opposite direction). Another process involves passing the film backing having upstanding precursor stems 102 through a stationary heated nip such that the forward motion of the film backing produces the wiping deforming motion necessary to create the J-shaped hooks. Yet another process involves brushing a stationary film backing having upstanding precursor stems 102 with a stiff, heated rotating disk to form J-shaped hooks which are oriented circumferentially around a center point. A further process involves forming hooks oriented in more than one direction. This process involves passing the film backing having upstanding precursor stems 102 through a first slotted calender roll and a second slotted, or a second smooth calender roll, where the gaps in the first and second rolls are staggered, if both have gaps. The velocity of the two rolls, relative to the velocity of the precursor substrate, is, e.g., positive (e.g., faster) and negative (e.g., slower or opposite direction), respectively (to produce hooks curling substantially "up-web" and "down-web"). Also, in any of the above processes the heating portion of the second step could be performed independently from the deformation portion of the second step. Heating of the stem tips could be done by any suitable heat source including a radiant, parabolic, ultrasonic or focused infrared lamp type of source which could be used alone or in combination with a heated nip.

Advantages of the present invention method include the ability to manufacture J-shaped hooks 106 which are generally functionally comparable to conventional molded J hooks in performance, particularly when used in disposable garments and like uses, but which can be made faster and on a wider moving web or film backing than was previously possible with conventional molding or weaving techniques. This is primarily due to the combination of the ease of processing of the straight precursor stems 102 and the efficiency of the various deforming methods disclosed above. In addition, the performance of any given hook strip 100 can be readily tailored to a specific loop material by altering the method to change hook parameters such as the hook opening height, hook opening width, final hook height or other structural parameters as will be discussed and taught in the examples below.

To have good flexibility and strength, the backing of the hook strip 100 is preferably from 0.025 mm to 0.512 mm thick and more preferably is from 0.064 mm to 0.254 mm thick, especially when hook strips 100 are made of polypropylene or a copolymer of polypropylene and polyethylene. However, virtually any thermoplastic resin that is suitable for extrusion molding may be used to produce the novel J-shaped hooks 106 and hook fastener strips 100. Thermoplastic resins that can be extrusion molded and should be useful in the invention include polyesters such as poly (ethylene terephthalate), polyamides such as nylon, poly (styrene-acrylonitrile), poly(acrylonitrile-butadiene-styrene), polyolefins such as polypropylene, and plasticized polyvinyl chloride. A particular preferred thermoplastic resin is an impact copolymer of polypropylene and polyethylene containing 17.5 percent polyethylene and having a melt flow index of 30, that is available as SRD7-560 from Union Carbide Company, Houston, Tex.

For some uses a stiffer thermoplastic material may be used, or the backing 104 can be coated with an optional layer of adhesive, such as a pressure sensitive adhesive 138, on its surface opposite the surface provided with the hooks 106, by which the material could be adhered to a substrate to help anchor the hook strip. Other suitable additional backing materials or additional layers include woven or non-woven materials, additional film layers, paper, or metal foil.

Preferably, when using the calender and like processes, a relative speed differential between the two calender rolls is between 0.02 meters per second and 0.5 meters per second.

In other embodiments, the heat source is a stationary heated nip, a heated disk, or a heated roller.

Figure 4:
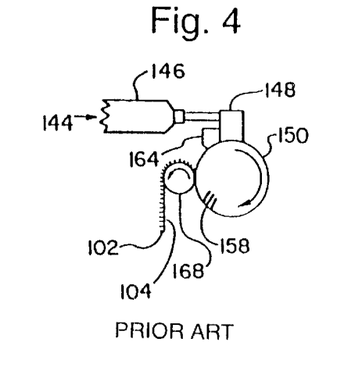
FIG. 4 is a schematic view of a method of making upstanding precursor stems and a backing.

As discussed above, various processes may be used to manufacture upstanding stems 102, with FIG. 4 disclosing one apparatus for performing this process step. In FIG. 4, a feed stream 144 of thermoplastic resin is fed into an extruder 146 from which a heated resin melt is fed through a die 148 to a rotating cylindrical mold 150. Cavities 158 in the cylindrical continuous surface of the mold 150 are optionally evacuated by an external vacuum system 164. The die 148 has an output radius equal to that of the mold 150 in order to provide a seal between the die 148 and the mold 150. Rapid flow of the resin into the mold cavities 158 induces molecular orientation parallel to the direction of flow, and the mold 150 is preferably water-cooled (cooling mechanism not shown) to provide rapid quenching to maintain this orientation in place. The solidified resin is stripped from the mold 150 by a stripper roll 168 as a substrate formed as a web or film backing 104 that has an array of upstanding precursor stems 102. Film backing 104 can either be wound into a roll for storage or fed directly into a J-shaped hook forming apparatus.

Figure 5:
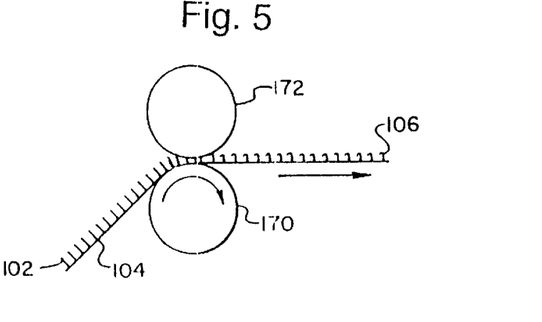
FIG. 5 is a schematic view of a finishing process to form J-shaped hooks from upstanding stems on a backing.

Once the film backing 104 with upstanding precursor stems 102 is produced, any of the above described processes may be used to form the J-shaped hooks 106, for example, the processes performable on the FIG. 5 apparatus and discussed in detail above. The apparatus depicted in FIG. 5 includes a capping station with a gap as well as chilled roller 170 and heated roller 172. One surface of film backing 104 is adjacent to and passes over the chilled roller 170 and portions of the stems 102 contact the heated roller 172. The surface of heated roller 172 generally is moving in the same direction that film backing 104 is traveling but at a different speed ranging from faster to slower, which would include the roller being completely stopped and in an extreme condition the roller 172 moving in the direction opposite film backing 104 travel. This speed differential will, primarily, determine the degree of rolling or curl imparted to each stem 102 as the distance between the roller surfaces is reduced.

Figure 6:
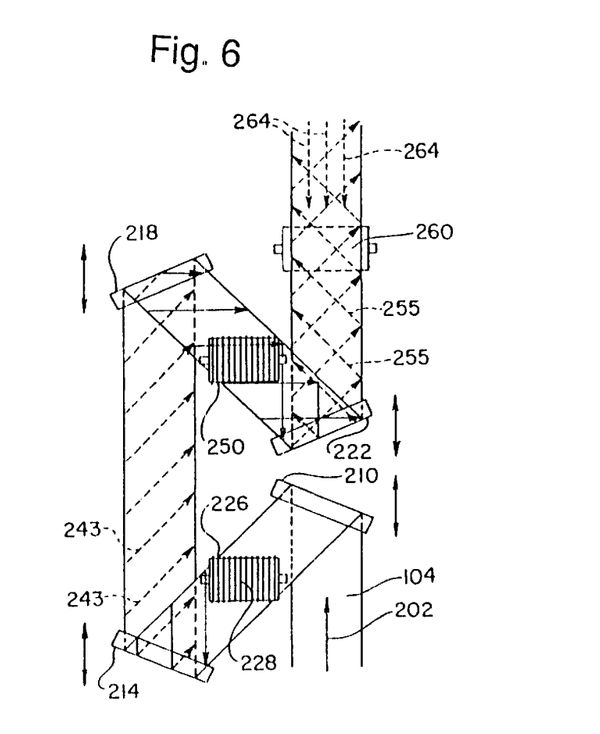
FIG. 6 is a schematic view of a finishing process to form multi-directional J-shaped hooks from upstanding stems on a backing.

FIG. 6 discloses a deformation process which incorporates an apparatus capable of forming J-shaped hooks 106 from stems 102 with hook orientations in two or more directions and at many combinations of angles with respect to film backing 104 centerline 202. This deformation process mechanism uses a shuttle mechanism and includes a plurality of idlers 210, 214, 218 and 222, which are attached to the same shuttle mechanism frame. This shuttle mechanism, including the idlers, moves up and down (in the plane of the figure) or with and against the direction of travel of film backing 104. When the shuttle mechanism velocity is matched to the line speed of film backing 104 and is moving against the direction of travel of film backing 104, then film backing 104 moves laterally at up to twice line speed. When the shuttle mechanism moves with the direction of travel of film backing 104, then at the appropriate shuttle mechanism speed the film backing 104 can stop moving laterally. While film backing 104 has stopped moving laterally, but is moving in the original direction of travel at line speed, it is brought in contact with the first hook forming device 226.

Device 226 is a heated roll with narrow, evenly spaced, elevated rings 228 on its surface. The surface of these rings can be moving in the same or different direction than the stems relative to device 226, as discussed above. This speed differential will in part determine the degree of rolling or curl imparted to each contacted precursor stem 102 when the distance between the rings and the film backing approaches its closest point.

Hook forming device 226 forms narrow rows 243 of J-shaped hooks 106 as film backing 104 passes by. These hooks 106 may be oriented at a 45 degree angle to substrate 104 centerline 202. A second like hook forming device 250 may make rows 255 of J-shaped hooks 106 oriented at a 45 degree angle from substrate 104 centerline 202 or 90 degrees from the first rows at the same time, when the film backing 104 stops moving laterally. Smooth heated roller 260 then forms any remaining upstanding stems into regions or rows 264 of J-shaped hooks 106 which are oriented 135 degrees from either of the other two rows (225 and 243).

When the distance between rows of stems 102 entering this embodiment of a shuttle mechanism is defined as X, the rings on the first hook forming device 226 are 2X wide and on 6X centers, and the rings on the second hook forming device 250 are 3X wide and on 6X centers, then an equal number of J-shaped hooks 106 will be oriented in each of the three directions. As will be appreciated by those skilled in the art, this process could be expanded to different angles of orientation or more directions of orientation.

Figure 7:
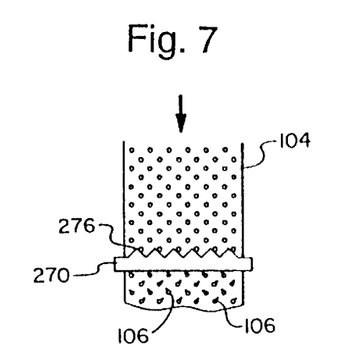
FIG. 7 is a schematic view of a finishing process to form multi-directional J-shaped hooks from upstanding stems on a backing.
Figure 8:
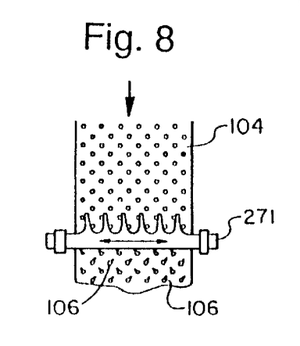
FIG. 8 is a schematic view of a finishing process to form multi-directional J-shaped hooks from upstanding stems on a backing.
Figure 9:
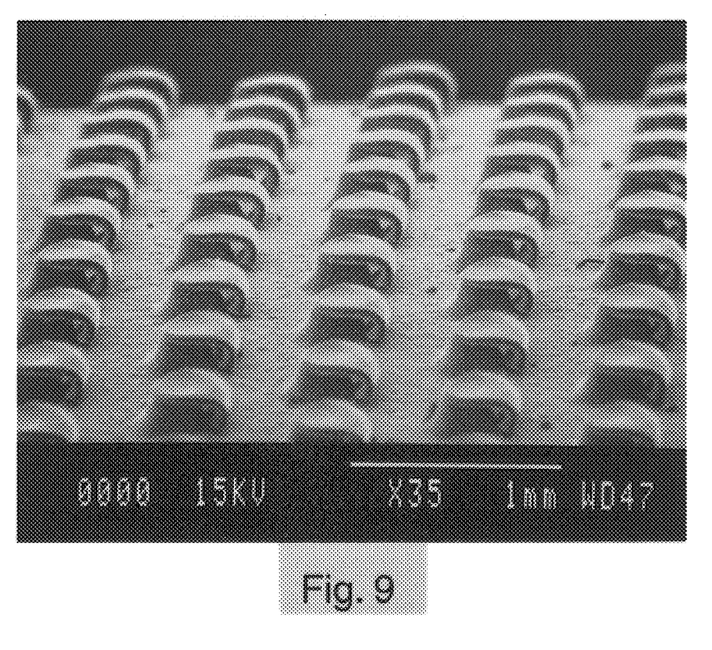
FIG. 9 is a scanning electron micrograph of a hook formed in accordance with Example 5 of the invention.
Figure 10:
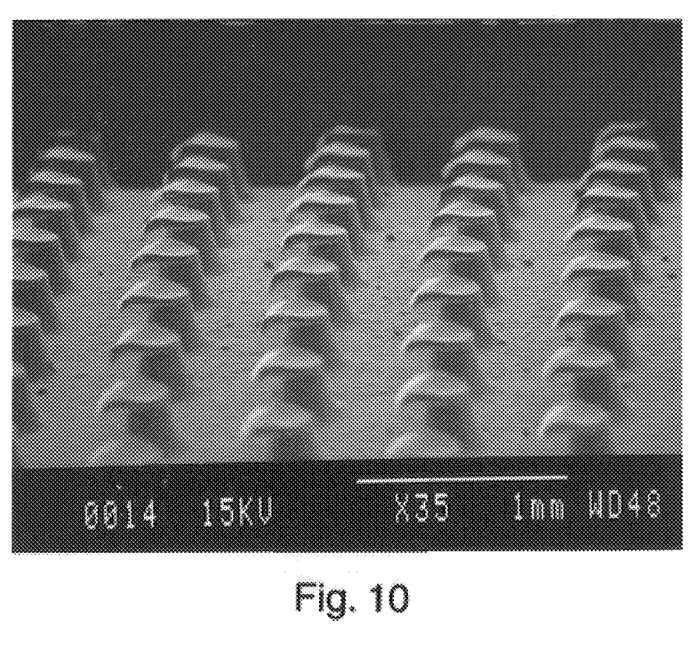
FIG. 10 is a scanning electron micrograph of a hook formed in accordance with Example 6 of the invention.
Figure 11:
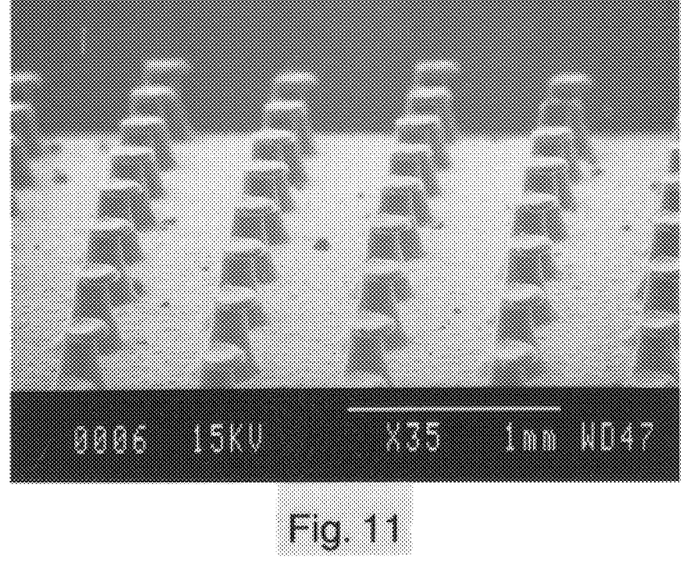
FIG. 11 is a scanning electron micrograph of a hook formed in accordance with Example 7 of the invention.
Figure 12:
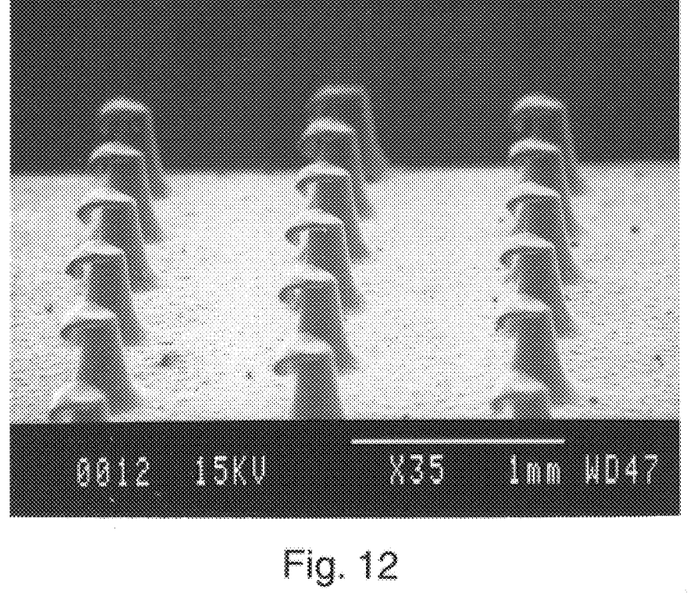
FIG. 12 is a scanning electron micrograph of a hook formed in accordance with Example 31 of the invention.

Yet another deformation process for forming J-shaped hooks 106 having more than one direction of orientation is shown in FIG. 7 and FIG. 8. This device may comprise a stationary heated blade 270 or shoe with teeth centered between every second row of stems 102. Alternatively, as shown in FIG. 8, a heated reciprocating blade 271 may be used. This blade has long, narrow teeth which give bi-directional orientation closer to 180 degrees. In each embodiment, the relative motion deforming principles of the invention operate as described above to create the distinctive hook shapes shown, for example, in FIG. 3.

The invention may be alternatively described as a method of making a hook strip having J-shaped hooks that can be used to perform hook and loop types of mechanical fastening requirements. In a preferred embodiment, the method includes using a pre-existing extruded integral substrate, such as a film backing, of material formed with an array of upstanding stems having tips at their ends opposite the backing, the backing and stems being simultaneously extruded. The stems being generally upstanding, continuously tapered protrusions without any fiber engaging portions at the tips. Preferably, the pre-existing substrate includes a solidified thermoplastic resin layer forming the backing with the same thermoplastic material also forming the array of upstanding stems. Also, the pre-existing substrate may consist of a single substrate having an array of upstanding stems of differing heights.

In addition, a heat source adapted for heating and a mechanism for deforming stem tips is provided. The substrate is positioned relative to the heat source such that an upper portion, preferably a distal end portion, including the stem tips, of a plurality of upstanding stems is heated. Subsequently or simultaneously, the substrate is moved to a position relative to the mechanism for deforming to create a hook strip of J-shaped hooks from the heated portion of the upstanding stem array. During the moving of the substrate, a top surface is formed, with a substantially planar upper surface. Also the hooked portion of each of the J-shaped hooks is created by the mechanism for deforming the heated portion of the array of upstanding stems. Also when the substrate is moving, a deformed portion of each of the plurality of J-shaped hooks is asymmetrically oriented relative to a substantially orthogonally connected non-deformed upstanding stem portion of each of the plurality of J-shaped hooks. Alternatively, when the substrate is moving, the heated portion of the array of upstanding stems on the substrate may be deformed in different orientations as discussed above. This is possible due to the independence of the deforming step from the step(s) necessary to produce the precursor stems. It will also be appreciated by those skilled in the art that another portion of the array of upstanding stems on the substrate may be deformed into shapes other than J-shaped hooks during the moving of the substrate. Throughout the process of making the hook strip, a portion of each of the upstanding stems is not deformed and preferably retains an initial molecular orientation.

In addition, an article of manufacture, made in accordance with the above method is provided which includes a hook portion of a hook-and-loop type of mechanical fastener. The deformed portion of each of the array of upstanding stems may be a generally tapered distal hook portion which has been deformed so that it extends from a generally downwardly projecting tip (however, in some cases the tip will project downward only slightly) up to a substantially planar upper portion 108 of the hook portion which is then connected to an upstanding stem portion. The final average hook height 118 (or height of the deformed stem) may range from between 0.05 mm and 4.0 mm. Furthermore, a density of hooks from the array of heated upstanding stems may range between 4 stems/cm$^2$ to about 2000 stems/cm$^2$. Preferably, for convenience, the article may be wound up into a roll for convenient storage and shipment and then cut to desired lengths of hook strips 100 as needed. When wound in a roll, the substantially planar upper surface 108 of each of the J-shaped hooks on the article is less likely to penetrate any adhesive layer on the surfaces opposite the hooks than prior hooks formed into distinct peak forms. The substantially planar upper surface 108 also mitigates against deformation of the film backing 104, due to the distribution of pressure applied against individual hooks if the hook strips are wound in a roll or the like. Also, the substantially planar upper surface 108 of each of the J-shaped hooks creates a hook strip having a tactile feel which is less rough than other hook and loop types of fasteners, e.g., more like the feel of a flat film and is much less likely to cause chaffing and skin irritation.

EXAMPLE 1

A roll having a plurality of J-shaped hooks 106, such as those shown in FIG. 3, was made under the conditions of Table I with the resulting dimensions of Table II below. In Table I, Relative Speed means the speed of the heated roll relative to the substrate line speed (so in Table 1, −70 percent means the heated roll is moving in an opposite direction to the substrate at a speed of 14 feet/minute).

TABLE I

| | |
|---|---|
| Heated Calender Roll Temperature | 290° F. |
| Chilled Calender Roll Temperature | 50° F. |
| Line Speed of Substrate | 6.1 meters/minute (20 feet/minute) |
| Gap Between Heated and Chilled Roll | .25 mm (10 mils) |
| Relative Speed | −70 percent |

TABLE II

| | |
|---|---|
| Distance Between Hooks | 64 mm (25 mils) |
| Hook Density | 248 hooks/cm$^2$ |
| Film Backing Caliper | .09 mm (3.5 mils) |
| Stem Diameter | .20 mm (8 mils) |
| Precursor Stem Height | .50 mm (18.5 mils) |

TABLE II-continued

| | |
|---|---|
| Hook Height | .25 mm (11 mils) |
| Hook Opening Height | .16 mm (6 mils) |
| Hook Opening Width | .16 mm (6 mils) |
| Hook Thickness | .10 mm (4 mils) |

The tests used independent hook strips 100 of a 2.54 centimeter (cm) by 10.16 cm size. The tests included a shear strength test using ASTM D-5169 and a 135 degree peel test conducted in the machine direction (MD) (for best hook engagement) and in the cross web direction (CD) (for nominal hook engagement). The peel test consisted of a 135 degree peel from a test patch of XML-4069 loop (commercially available from Minnesota Mining & Manufacturing Company) at a peel rate of 30.5 cm per minute. The hook samples were rolled down onto the loop using five passes of a 2.04 kilogram (4.5 pound) roller. The tests were run at 70° F. and 50 percent relative humidity. The results are shown in Table III.

TABLE III

| | CD | MD |
|---|---|---|
| Peak Peel (grams/cm) | 63 ± 9 | 78 ± 16 |
| Shear (grams/cm$^2$) | 487 ± 84 | 835 ± 67 |

EXAMPLES 2 THROUGH 17

In these examples, a device as shown in FIG. 5 was employed where the top heated calender roll 172 was heated with oil; the bottom calender roll 170 was chilled with water. Both rolls were chrome plated and approximately 10 inches in diameter. The bottom chilled calender roll was fixed and 3 inch diameter pistons were used to position the heated calender roll. The gap between the heated calender roll and the chilled calender roll was set with a screw and stop set up. For the experiments described below, a pressure of 40 psi in the pistons was sufficient to prevent the heated roll from floating (opening the gap) when the precursor material was calendered.

The speed of the heated roll (s2) could be set independently of the speed of the chilled roll (s1). The overspeed is the difference between s1 and s2. For example, a 110 percent overspeed means that the heated roll was turning 10 percent faster than the chilled roll; a −70 percent overspeed means that the heated roll was turning backwards at 70 percent of the speed of the chilled roll.

In all the experiments, the line speed of the web was slaved to the chilled roll speed. Therefore, the surface velocity, υ, of the heated roll at the tips of the stems is determined by the formula:

$$\upsilon = s1 - s2$$

For Examples 2 through 17 summarized in Table IV below, the chilled roll was 17° C. (60° F.) with the nip pressure set at 276 KPa (40 psi). The web total caliper, backing thickness and stem height, was approximately 0.61 mm (0.024 inches).

TABLE IV

| Example | Gap (inches) | Hot Roll Temp (°F.) | Line Speed (fpm) | Overspeed (percent) | Surf. Velocity (fpm) |
|---|---|---|---|---|---|
| 2 | 0.014 | 305 | 20 | −70 | 34 |
| 3 | 0.014 | 305 | 20 | 0 | 20 |
| 4 | 0.014 | 305 | 10 | −240 | 34 |
| 5 | 0.014 | 305 | 10 | −100 | 20 |
| 6 | 0.014 | 285 | 20 | −70 | 34 |
| 7 | 0.014 | 285 | 20 | 0 | 20 |
| 8 | 0.014 | 285 | 10 | −240 | 34 |
| 9 | 0.014 | 285 | 10 | −100 | 20 |
| 10 | 0.019 | 305 | 20 | −70 | 34 |
| 11 | 0.019 | 305 | 20 | 0 | 20 |
| 12 | 0.019 | 305 | 10 | −240 | 34 |
| 13 | 0.019 | 305 | 10 | 100 | 20 |
| 14 | 0.019 | 285 | 20 | −70 | 34 |
| 15 | 0.019 | 285 | 20 | 0 | 20 |
| 16 | 0.019 | 285 | 10 | −240 | 34 |
| 17 | 0.019 | 285 | 10 | −100 | 20 |

For each of the formed hook strip materials the hook dimensions were measured by an optical microscope (an average of 6 measurements). $A_1$ and $A_2$ are the length and width respectively of the hook upper surface 108. B is the hook head height 129. C is the hook overhang 109. D is the hook head thickness 128 at the base of head 107 and E is the combined backing thickness 132 and hook height 118. These measurements are set forth in Table V.

Table VI summarizes the average peel force values for Examples 1 through 16. The peel values were measured using ASTM D-5170 (describe briefly) against a nonwoven material (3M XML-5167 available from 3M Company, St. Paul, Minn.) loop with the hooks on the strip oriented in the cross direction to the peel direction of the hook strip (which results in generally lower peel values).

The results shown in Table VI indicate that the hook head height has a significant effect on peel performance with decreasing head height generally increasing peel performance. In Examples C4 and C5 the hook head extended and contacted to the base film 104 leaving no gap for fibers to get under the head, hence the nil peel values. In Example 2, although there was little gap (E-B) between the hook head and the base film the hook head was very thin at its distal end such that it was relatively easy for fibers to push it out of the way. Otherwise E-B was related to B such that as it increased (e.g., B decreased) peel performance likewise increased.

Generally, as C increased, peel performance also increased. However, the measurement of this value was very inaccurate as it was measured from the top of the hook making it difficult to differentiate and even when the measured value was nil there was likely still some overhang from the tip of the deformed hook head.

TABLE V

| Example | $A_1$ (mils) | $A_2$ (mils) | B (mils) | C (mils) | D (mils) | E (mils) | $A_1 \times A_2$ (sq mils) | E–B (mils) |
|---|---|---|---|---|---|---|---|---|
| 2 | 10.7 | 12.4 | 7.3 | 0 | 1.9 | 8.3 | 132.68 | 1 |
| 3 | 10.1 | 13 | 5.4 | 1.4 | 1.9 | 8.4 | 131.3 | 3 |
| 4 | 12.9 | 12.4 | 6.8 | 1.3 | 1 | 6.8 | 159.96 | 0 |
| 5 | 13.5 | 12.9 | 6.7 | 0.5 | 1.6 | 6.7 | 174.15 | 0 |
| 6 | 11.2 | 12 | 4.8 | 1.6 | 2 | 9 | 134.4 | 4.2 |
| 7 | 12.1 | 11.4 | 2.3 | 3.6 | 2.1 | 8.9 | 137.94 | 6.6 |
| 8 | 10.5 | 11.2 | 6.1 | 0 | 2.1 | 8.8 | 117.6 | 2.7 |
| 9 | 10.9 | 10.7 | 6.5 | 0.1 | 2.5 | 8.6 | 116.63 | 2.1 |
| 10 | 10.9 | 10.4 | 3.9 | 2 | 1.8 | 11.1 | 113.36 | 7.2 |

TABLE V-continued

| Example | $A_1$ (mils) | $A_2$ (mils) | B (mils) | C (mils) | D (mils) | E (mils) | $A_1 \times A_2$ (sq mils) | E–B (mils) |
|---|---|---|---|---|---|---|---|---|
| 11 | 10.6 | 10.2 | 4.1 | 2.5 | 2.1 | 11.2 | 108.12 | 7.1 |
| 12 | 10.3 | 10.1 | 6.4 | 0.8 | 1.6 | 10.4 | 104.03 | 4 |
| 13 | 13 | 9.8 | 5.5 | 0.9 | 1.9 | 10.1 | 127.4 | 4.6 |
| 14 | 9.2 | 11.4 | 2.9 | 1.2 | 2 | 10.5 | 104.88 | 7.6 |
| 15 | 10.1 | 11 | 1.9 | 3 | 1.9 | 11.3 | 111.1 | 9.4 |
| 16 | 8.7 | 10.6 | 4.7 | 0.9 | 2.3 | 10.6 | 92.22 | 5.9 |
| 17 | 8.9 | 10.8 | 4.8 | 1.2 | 2.5 | 11.5 | 96.12 | 6.7 |

TABLE VI

| Example | Average Peel (g/cm) |
|---|---|
| 2 | 5.4 |
| 3 | 13.7 |
| 4 | 0 |
| 5 | 0 |
| 6 | 19.9 |
| 7 | 20.2 |
| 8 | 4 |
| 9 | 7.2 |
| 10 | 12.3 |
| 11 | 18.6 |
| 12 | 4.3 |
| 13 | 7.9 |
| 14 | 15.9 |
| 15 | 19.8 |
| 16 | 8.3 |
| 17 | 12.3 |

EXAMPLES 18 THROUGH 33

For Examples 18 through 33 the gap width was changed to 0.5 mm (0.019 in.). Otherwise the examples were run on the equipment described for Examples 2 through 17 with the conditions set forth in these examples and in Table VII below.

TABLE VII

| Example | Caliper (inches) | Hot Roll Temp (°F.) | Line Speed (fpm) | Overspeed (percent) | Surf. Velocity (fpm) |
|---|---|---|---|---|---|
| 18 | 0.024 | 305 | 20 | –70 | 34 |
| 19 | 0.024 | 305 | 20 | 0 | 20 |
| 20 | 0.024 | 305 | 10 | –240 | 34 |
| 21 | 0.024 | 305 | 10 | –100 | 20 |
| 22 | 0.024 | 285 | 20 | –70 | 34 |
| 23 | 0.024 | 285 | 20 | 0 | 20 |
| 24 | 0.024 | 285 | 10 | –240 | 34 |
| 25 | 0.024 | 285 | 10 | –100 | 20 |
| 26 | 0.020 | 305 | 20 | –70 | 34 |
| 27 | 0.020 | 305 | 20 | 0 | 20 |
| 28 | 0.020 | 305 | 10 | –240 | 34 |
| 29 | 0.020 | 305 | 10 | –100 | 20 |
| 30 | 0.020 | 285 | 20 | 70 | 34 |
| 31 | 0.020 | 285 | 20 | 0 | 20 |
| 32 | 0.020 | 285 | 10 | –240 | 34 |
| 33 | 0.020 | 285 | 10 | –100 | 20 |

The dimensions of the Examples 18 through 33 hook materials were then measured as were Examples 2 through 17 and as set forth in Table VIII. The reported measured values were the average of six different hooks.

TABLE VIII

| Example | $A_1$ (mils) | $A_2$ (mils) | B (mils) | C (mils) | D (mils) | E (mils) | $A_1 \times A_2$ (sq mils) | E–B (mils) |
|---|---|---|---|---|---|---|---|---|
| 18 | 9.5 | 9.5 | 5.3 | 1.6 | 2.6 | 14.4 | 90.25 | 9.1 |
| 19 | 9 | 8.9 | 4.8 | 1.7 | 2.2 | 14.9 | 80.1 | 10.1 |
| 20 | 20.5 | 4.3 | 10.3 | 13.2 | 2.4 | 13.3 | 88.15 | 3 |
| 21 | 22.3 | 4.2 | 8.4 | 11.4 | 2 | 14 | 93.66 | 5.6 |
| 22 | 8 | 8.6 | 4 | 2 | 2.3 | 15.4 | 68.8 | 11.4 |
| 23 | 8.9 | 8.7 | 3.5 | 3 | 2.6 | 15.6 | 77.43 | 12.1 |
| 24 | 7.7 | 8.4 | 5.3 | 0.2 | 2 | 15.3 | 64.68 | 10 |
| 25 | 7.7 | 8.7 | 4.7 | 0.9 | 1.9 | 14.3 | 66.99 | 9.6 |
| 26 | 10.9 | 10.4 | 3.9 | 2 | 1.8 | 11.1 | 113.36 | 7.2 |
| 27 | 10.6 | 10.2 | 4.1 | 2.5 | 2.1 | 11.2 | 108.12 | 7.1 |
| 28 | 10.3 | 10.1 | 6.4 | 0.8 | 1.6 | 10.4 | 104.03 | 4 |
| 29 | 13 | 9.8 | 5.5 | 0.9 | 1.9 | 10.1 | 127.4 | 4.6 |
| 30 | 9.2 | 11.4 | 2.9 | 1.2 | 2 | 10.5 | 104.88 | 7.6 |
| 31 | 10.1 | 11 | 1.9 | 3 | 1.9 | 11.3 | 111.1 | 9.4 |
| 32 | 8.7 | 10.6 | 4.7 | 0.9 | 2.3 | 10.6 | 92.22 | 5.9 |
| 33 | 8.9 | 10.8 | 4.8 | 1.2 | 2.5 | 11.5 | 96.12 | 6.7 |

These examples were then tested for peel performance as were Examples 18 through 33. The same trends were noticed.

TABLE IX

| Sample | Average Peel (g/cm) |
|---|---|
| 17 | 16.8 |
| 18 | 17.7 |
| 19 | 5.9 |
| 20 | 4.8 |
| 21 | 14.9 |
| 22 | 16.1 |
| 23 | 413.7 |
| 24 | 14.1 |
| 25 | 12.3 |
| 26 | 18.6 |
| 27 | 4.3 |
| 28 | 7.9 |
| 29 | 15.9 |
| 30 | 19.8 |
| 31 | 8.3 |
| 32 | 12.3 |

What is claimed:

1. A method of continuously forming a hook strip having a plurality of J-shaped hooks that can be used as a mechanical fastener, the method using an initial substrate of material, the method comprising the steps of:

(a) providing a substrate of thermoplastic material having a softening temperature comprising a backing having an array of upstanding preformed precursor stems of the thermoplastic material having a softening temperature and having upstanding distal tips at ends of the stems opposite the backing which distal tips have given first cross sectional dimensions;

(b) providing a heat source adapted for heating a plurality of stern tips to a temperature above the softening temperature;

(c) providing a mechanism for deforming a plurality of stem distal tips;

(d) positioning the substrate relative to the heat source such that the distal tip portions of a plurality of upstanding stems are preferentially heated above the softening temperature; and (e) moving the substrate into contact with the mechanism for deforming to create a hook strip having a plurality of J-shaped hooks created by contacting the heat softened distal tip portions of the array of upstanding stems on the substrate with the mechanism for deforming, thereby forming deformed distal tip portions with generally planar upper surface portions on the deformed distal tip portions of the stems wherein the deformed distal tip portions have second cross sectional dimensions different than the first cross sectional dimensions of undeformed distal tip portions of the stems.

2. The method of claim 1 wherein the moving step includes forming a substantially smooth and planar upper surface portion on the deformed distal tip portions of each of the plurality of J-shaped hooks.

3. The method of claim 2 wherein the moving step further includes asymmetrically orienting the deformed distal tip portions of each of the plurality of J-shaped hooks relative to substantially non-deformed portions of the precursor stems of each of the plurality of J-shaped hooks.

4. The method of claim 3 wherein the contact with the mechanism for deforming creates deformed distal tip portions that are partially orthogonally oriented relative to the non-deformed portions.

5. The method of claim 1 wherein the step of providing the heat source comprises providing a heated calender roll.

6. The method of claim 5 wherein the positioning step includes positioning the substrate on another calender roll.

7. The method of claim 6 wherein the calender roll on which the substrate is positioned is a chilled calender roll.

8. The method of claim 6 wherein the calender roll on which the substrate is positioned is adjacent to the heated calender roll and is rotated at a different speed than the heated calender roll.

9. The method of claim 8 wherein a relative speed differential between the two calender rolls is between 0.5 meters per second and 0.02 meters per second.

10. The method of claim 6 wherein the calender roll on which the substrate is positioned is adjacent to the heated calender roll and is rotated in a different direction than the heated calender roll.

11. The method of claim 1 wherein the step of providing the heat source comprises providing a heat source selected from the group consisting of a stationary heated nip, a heated disk, a heated roller, a radiant heat source, a parabolic heat source, ultrasonic heat source, and a focused infrared heat source.

12. The method of claim 11 wherein the positioning step includes the heated disk heat source contacting the substrate in a circular relative motion manner to form a plurality of J-shaped hooks having a circular deformation pattern in plan view.

13. The method of claim 1 wherein the moving step includes deforming the heated distal tip portions of the array of upstanding stems on the substrate in different orientations.

14. The method of claim 13 wherein the step of providing the heat source includes providing a heated disk having a deforming surface with a circumferential pattern of ridges.

15. The method of claim 1 wherein the initial substrate is a single substrate having an array of upstanding stems of differing heights.

16. The method of claim 1 wherein the step of providing the heat source includes providing a plurality of heated slotted calender rolls adapted for deforming a portion of the array of upstanding stems on the initial substrate in differing orientations.

17. The method of claim 1 wherein the moving step includes moving the substrate so that a centerline of the substrate is non-orthogonal to a centerline of the mechanism, for deforming the heated distal tip portions of the array of upstanding stems.

18. The method of claim 1 wherein the moving step includes deforming a portion of the array of upstanding stems into shapes other than J-shaped hooks.

* * * * *

UNITED STATES PATENT AND TRADEMARK OFFICE
CERTIFICATE OF CORRECTION

PATENT NO.    : 6,054,091
DATED         : April 25, 2000
INVENTOR(S)   : Philip Miller and William L. Melbye It is certified that error appears in the above-identified patent and that said Letters Patent is hereby corrected as shown below:

Column 14,
Line 8, insert -- the -- between "of" and "undeformed" and delete "the" before "stems".

Signed and Sealed this

Seventh Day of May, 2002

Attest:

JAMES E. ROGAN
Attesting Officer     Director of the United States Patent and Trademark Office